April 3, 1928.                C. F. HARTKOPF                1,664,744
                                 NUT LOCK
                           Filed March 3, 1927
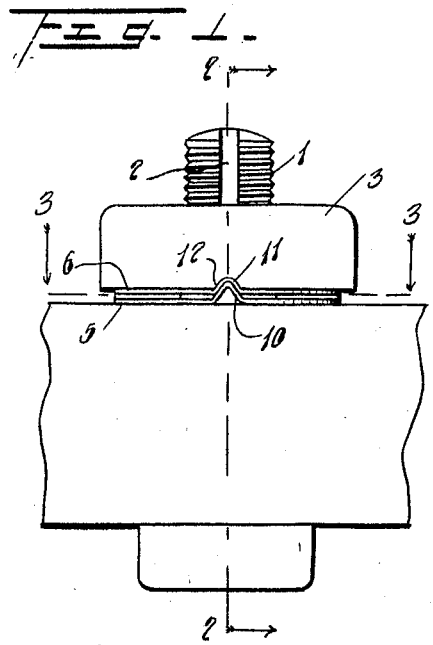
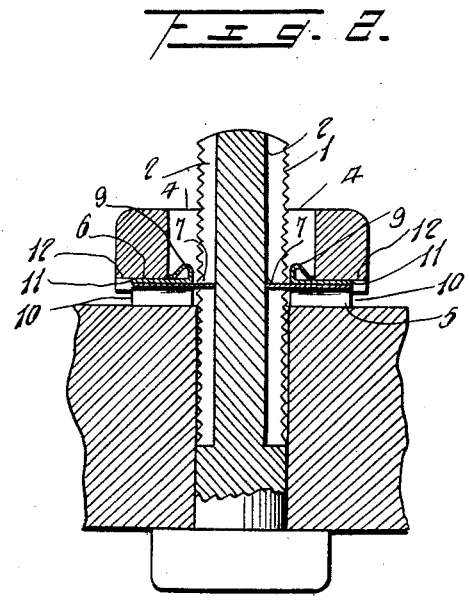
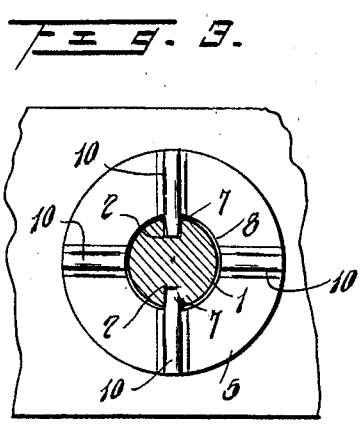
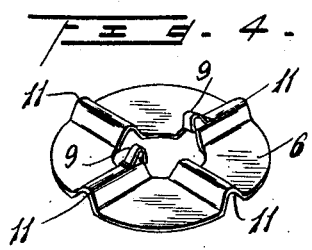
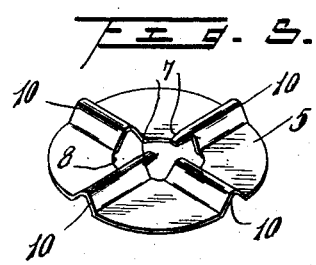
Inventor
C. F. Hartkopf.
By
Attorney Patented Apr. 3, 1928.

1,664,744

UNITED STATES PATENT OFFICE.

CARL F. HARTKOPF, OF GEORGETOWN, ILLINOIS.

NUT LOCK.

Application filed March 3, 1927. Serial No. 172,392.

The invention relates to means for locking a nut on a bolt and has for its object the provision of an improved nut lock of the base washer type employing two washers, one washer being secured to the bolt, the other to the nut, and providing the washers with interengaging undulations to prevent casual displacement of the nut relatively to the bolt.

A further object of the invention is the provision of a nut lock in which the stem of the bolt is provided with longitudinal grooves cutting the threads on the bolt and providing a sheet metal washer having tongues to engage in the grooves and having radial undulations, and also providing the threaded nut with grooves cutting the threads of the bolt and a sheet metal washer having tongues projecting upwardly therefrom to engage in the grooves, said washer having radial undulations to engage the undulations on the first mentioned washer, and the base of the nut provided with grooves to engage the undulations on the second washer.

The invention will be described in detail hereinafter and will be found illustrated in the accompanying drawings, in which Figure 1 is a view of the nut lock mounted on the bolt, and in locking position, Figure 2 is a longitudinal sectional view of the nut lock on a plane indicated by the line 2—2 of Figure 1, Figure 3 is a transverse sectional view on a plane indicated by the line 3—3 of Figure 1, and Figures 4 and 5 are detail perspective views of the two washers.

In the drawings similar reference characters will be used to designate corresponding parts in all of the views.

The improved nut lock is shown in connection with a bolt 1 having longitudinal grooves 2 in its stem and cutting the threads of the bolt, and a nut 3 having grooves 4 cutting the threads of the nut. The locking element comprises the two washers 5 and 6 shown respectively in detail in Figures 4 and 5. The washer 5 has tongues 7 extending inwardly of the central opening 8 to receive the stem of the bolt, said tongue engaging in grooves 2 to hold the washer from rotation relatively to the stem of the bolt, and the washer 6 is provided with perpendicular tongues 9 that fit into grooves 4 in the nut to prevent rotation of the washer 6 relatively to the nut. The washers 5 and 6 are preferably made of sheet metal of suitable gauge, and each of the washers have radial undulations formed therein, said undulations being designated 10 and 11 respectively, and when the nut is screwed down on the bolt the undulations on the washer 5 by engaging in the depression formed by the undulations on the washer 6 serves to lock the two washers from relative movement and the nut relatively to the stem of the bolt against casual displacement. The base of the nut 3 is also provided with radial grooves 12 to receive the undulations on the washer 6 and serves furthermore to lock the nut to the washer and also to prevent deforming the undulations 11 when the nut is screwed down tightly.

What is claimed is:—

1. A nut lock, comprising a bolt having a longitudinal groove cutting the threads of the stem, a washer having an opening to receive the stem of the bolt, a tongue extending inwardly of the wall of said opening to engage in the groove in the bolt, a nut having a threaded opening to engage the bolt and having a groove cutting the threads therein, a second washer having an opening to receive the bolt, a tongue on said second washer engaging the groove in the nut, and interengaging elements on said washers to prevent relative rotation thereof.

2. A nut lock, comprising a bolt having a longitudinal groove cutting the threads on its stem, a washer having an opening to receive the stem of the bolt, a tongue extending inwardly of the wall of said opening to engage in the groove in the bolt, a nut having a threaded opening to engage the bolt and having a groove cutting the threads therein, a second washer having an opening to receive the bolt, a tongue on said second washer engaging the groove in the nut, each of said washers being made of sheet metal and having interengaging undulations formed therein, and the base of the nut provided with grooves to engage the undulations in the second washer.

3. A nut lock, comprising a bolt having longitudinal grooves cutting the threads on its stem, a sheet metal washer having an opening to receive the stem of the bolt, projections extending inwardly of the wall of said opening to engage in the grooves of the bolt, a nut having a threaded opening to engage the bolt and having grooves cutting the threads therein, a second sheet metal washer having an opening to receive the bolt, tongues formed integral with the washer and bent upwardly therefrom to engage in the grooves in the nut, said washers having interengaging radially extending undulations formed therein, and the base of the nut provided with grooves to engage the undulations in the second washer.

In testimony whereof I affix my signature.

CARL F. HARTKOPF.